US010715588B2

(12) United States Patent
Shiell et al.

(10) Patent No.: US 10,715,588 B2
(45) Date of Patent: Jul. 14, 2020

(54) MULTIPLE HIT LOAD BALANCING

(71) Applicant: Verizon Digital Media Services Inc., Dulles, VA (US)

(72) Inventors: Derek Shiell, Los Angeles, CA (US); Marcel Eric Schechner Flores, Los Angeles, CA (US); Harkeerat Singh Bedi, Los Angeles, CA (US)

(73) Assignee: Verizon Digital Media Services, Inc., Dulles, VA (US)

( * ) Notice: Subject to any disclaimer, the term of this patent is extended or adjusted under 35 U.S.C. 154(b) by 270 days.

(21) Appl. No.: 15/882,828

(22) Filed: Jan. 29, 2018

(65) Prior Publication Data

US 2019/0238627 A1  Aug. 1, 2019

(51) Int. Cl.
*H04L 29/08* (2006.01)
*H04L 29/06* (2006.01)

(52) U.S. Cl.
CPC ...... *H04L 67/1002* (2013.01); *H04L 63/0272* (2013.01); *H04L 63/0428* (2013.01); *H04L 63/164* (2013.01); *H04L 67/141* (2013.01); *H04L 67/2842* (2013.01); *H04L 67/02* (2013.01); *H04L 67/42* (2013.01)

(58) Field of Classification Search
CPC ............. H04L 67/1002; H04L 63/0272; H04L 63/0428; H04L 63/164; H04L 67/171; H04L 67/2842; H04L 67/02
See application file for complete search history.

(56) References Cited

U.S. PATENT DOCUMENTS

| | | | | |
|---|---|---|---|---|
| 10,097,448 B1* | 10/2018 | Howard | ............... | H04L 43/0894 |
| 2013/0227051 A1* | 8/2013 | Khakpour | ........... | H04L 67/2842 709/213 |
| 2014/0195686 A1* | 7/2014 | Yeager | ................ | H04L 67/1023 709/226 |
| 2016/0065576 A1* | 3/2016 | Zhang | ................. | G06F 16/2455 726/3 |
| 2016/0337426 A1* | 11/2016 | Shribman | ........... | H04L 65/4084 |

* cited by examiner

*Primary Examiner* — Philip J Chea
*Assistant Examiner* — Robert B McAdams
(74) *Attorney, Agent, or Firm* — Ansari Katiraei LLP; Arman Katiraei; Sadiq Ansari

(57) ABSTRACT

Multiple hit load balancing provides a quasi-persistent request distribution for encrypted requests passing over secure connections as well as for multiple requests passing over the same connection. The multiple hit load balancing involves tracking object demand at each server of a set of servers. The multiple hit load balancing further involves dynamically scaling the servers that cache and directly serve frequently requested objects based on the demand that is tracked by each of the servers. For infrequently requested objects, the servers perform a peer retrieval of the objects so to limit the number of the same object being redundantly cached by multiple servers of the set of servers.

17 Claims, 6 Drawing Sheets

MULTIPLE HIT LOAD BALANCING

BACKGROUND ART

A load balancer distributes client connections and requests across several servers. This distribution is intended to balance the load of each server such that no one or more servers receives a disproportionate amount of the load while other servers go underutilized.

The load balancer is disposed at a network point of ingress. The network point of ingress is typically a common address of a point-of-presence (PoP) at which content and services hosted or served by the set of servers can be accessed by clients.

Persistent request distribution is one manner by which the load balancer can distribute requests across the servers. With persistent request distribution, the load balancer distributes requests for the same subset of content or services to the same servers. Each server is therefore tasked with serving a specific subset of the content or services that are hosted or otherwise accessible from the PoP in which the servers operate.

Persistent request distribution involves the load balancer receiving and inspecting client object requests. This typically includes inspecting the Uniform Resource Locator (URL) of the object request in order to identify the content or service being requested. The load balancer can perform a hash on the URL or other request parameters to identify which of the servers is tasked with delivering the requested content or service. The Cache Array Routing Protocol (CARP) is one such persistent request distribution scheme.

The greater usage of secure connections has caused many of the existing persistent request distribution schemes to fail. With secure connections, such as Secure Sockets Layer (SSL) or Transport Layer Security (TLS) connections, the client object request is encrypted. The load balancer is unable to inspect the request without establishing the secure connection with the client and performing computationally expensive decryption operations. This can create a potential bottleneck if the load balancer is the termination point for connections of the PoP and if the load balancer performs all decryption for all connections and requests directed to the set of servers. A further issue is transferring a secure connection from the load balancer to one of the servers so that the server may respond to the client request over the secure connection. Without secure connections, the packets could simply be forwarded to the client either through or around the load balancer. With secure connections, the packets served by the server have to be encrypted using the encryption parameters for the secure connection. If the secure connection is established with the load balancer, the server has to pass the content or services to the load balancer so that the load balancer can encrypt the objects before they can be sent to the client over the secure connection. Here again, the load balancer becomes a bottleneck. Alternatively, the load balancer could engage in time and resource intensive operations to hand-off the secure connection to the server. This becomes infeasible as the number of secure connections increases. If the load balancer was to forego establishing the secure connection with the client, it would be unable to receive or inspect the encrypted object request, and would therefore be unable to perform a persistent request distribution.

The shift from HyperText Transfer Protocol (HTTP) version 1 to HTTP/2 has also caused many of the existing persistent request distribution schemes to fail for different reasons. HTTP/2 allows for multiple object requests for different content or services to be passed over the same connection. The requested content or services may be served from different servers. Since there is one connection over which the requests are sent, the load balancer is limited to sending the requests to one server. The receiving server can be overloaded if it receives too many such requests over a short period of time. Alternatively, the load balancer can perform a repeated hand-off and hand-back of the connection so that each incoming request over that connection is distributed to a different server. As noted above, each such connection hand-off or hand-back is both time-consuming and resource intensive for both the load balancer and the servers.

Losing persistent request distribution can lead to extensive cache pollution. Cache pollution is where the same content or services are inefficiently cached by multiple servers, thereby reducing the aggregate cache footprint of the set of servers. Losing persistent request distribution also leads to significant intra-PoP cross traffic. When a first server of a set of servers operating in a PoP receives an object request for content or services that it has not cached and is not tasked with serving, that first server will attempt to retrieve the content or service from a second server of the set of servers that is tasked with serving that content or service. This intra-PoP retrieval is faster than if the first server was to retrieve the content or service from a remote origin server outside the PoP. However, the intra-PoP retrieval consumes server bandwidth that is otherwise used in responding to client requests and serving content and services to the requesting clients.

In the worst-case scenario, half of all bandwidth in the PoP could be lost to this cross retrieval of content and services. Such a loss in bandwidth leads to a significant degradation in the performance of the set of servers and their ability to respond to incoming object requests.

Accordingly, there is a need to minimize the cache pollution and amount of intra-PoP cross traffic that results when losing the ability to persistently distribute specific object requests to specific servers. There is therefore a need to preserve or adapt persistent request distribution for at least some subset of the set of encrypted requests arriving over secure connections. There is also a need to preserve or adapt persistent request distribution for at least some subset of the set of multiple requests arriving over the same single connection without creating a bottleneck at the load balancer or PoP point of ingress.

BRIEF DESCRIPTION OF THE DRAWINGS

A preferred embodiment for multiple hit load balancing will now be described, by way of example only, with reference to the accompanying drawings in which.

DETAILED DESCRIPTION

Figure 1:
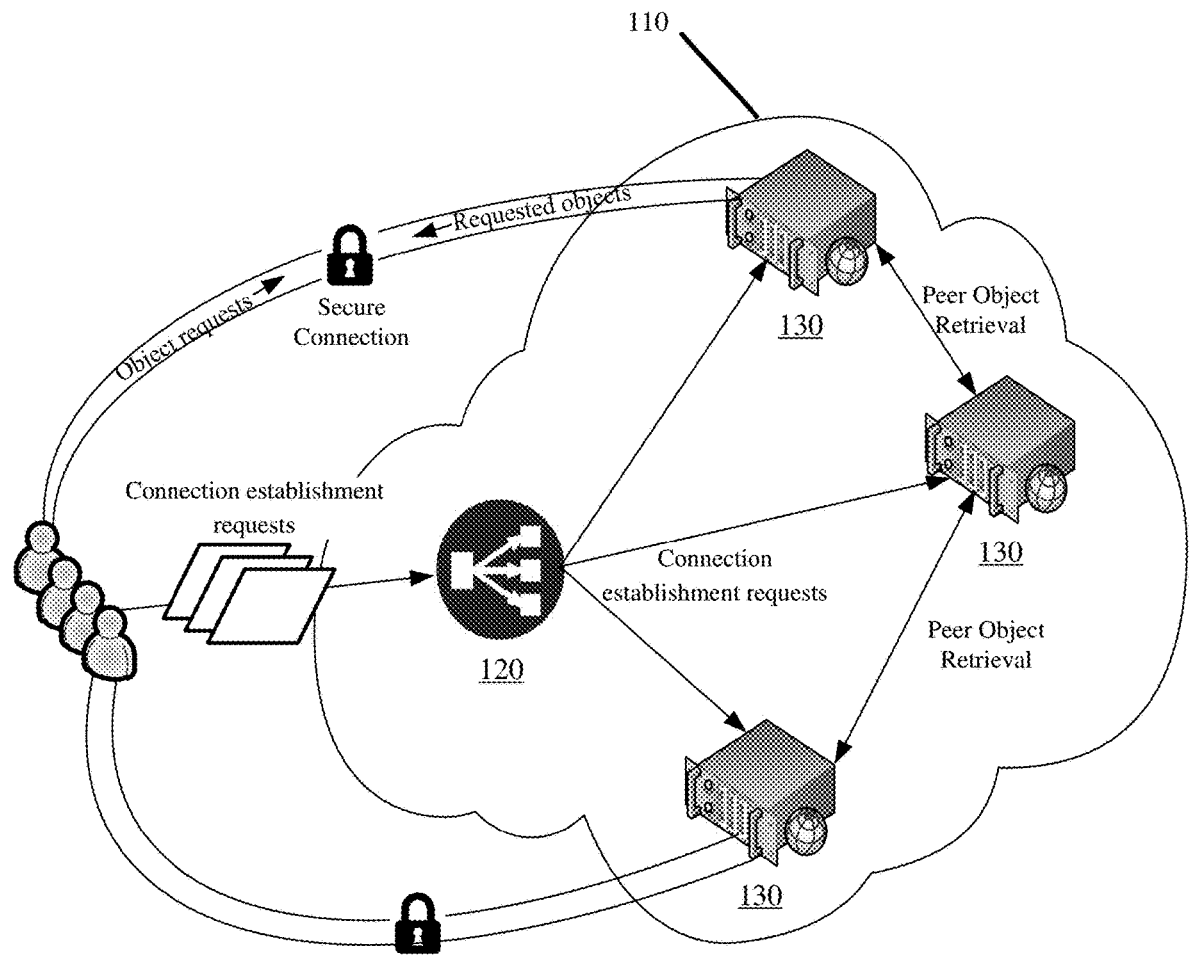
FIG. 1 presents an exemplary architecture for multiple hit load balancing in accordance with some embodiments.

This disclosure is for multiple hit load balancing. The multiple hit load balancing provides a quasi-persistent request distribution for encrypted object requests passing over secure connections as well as for multiple requests passing over the same connection. The multiple hit load balancing and the resulting quasi-persistent request distribution limits intra point-of-presence (PoP) cross traffic to the peer retrieval of infrequently requested objects while eliminating the intra-PoP cross traffic for frequently requested objects.

The multiple hit load balancing shifts request distribution from a load balancer or request distribution server to the object distribution servers that host and serve the objects that are the targets of the received requests. In doing so, the multiple hit load balancing decentralizes and distributes the request distribution steps such that the potential for bottleneck at the point of ingress to the set of object distribution servers is eliminated.

Moreover, the multiple hit load balancing dynamically scales the object distribution servers that cache and serve the frequently requested objects so that there is no intra-PoP cross traffic after a server receives multiple hits for a particular frequently requested object. The dynamic scaling mirrors typical hot object scaling in which additional servers are allocated to serve hot objects (i.e., objects receiving excess demand or a high volume of requests), except that the multiple hit load balancing allows the dynamic scaling to occur in a decentralized manner and be essentially instantaneous in response to detected excess demand. In particular, the object distribution servers scale and change the objects they cache, host, and serve in response to request counts received by each object distribution server.

The term object refers to content, services, or other data that is hosted or served by an object distribution server to various clients. The object distribution server serves the objects over a digital network, such as the Internet, in response to client requests for those objects. The client requests may be passed as HyperText Transfer Protocol (HTTP) GET messages over unsecure connections or as HTTP Secure (HTTPS) GET messages over secure connections, wherein Secure Sockets Layer (SSL) and Transport Layer Security (TLS) are examples of two protocols for establishing the secure connections. The multiple hit load balancing supports other request formats, request message types, connection establishment protocols, and messaging protocols with which to send the requests and the requested objects.

The multiple hit load balancing differentiates frequently requested objects from infrequently requested objects at individual object distribution servers operating within a point-of-presence (PoP). The object distribution servers are typically disposed behind one or more load balancers or other network devices (e.g., request distribution servers) at the PoP point of ingress through which incoming connection establishment requests and object requests arrive. The differentiation of frequently requested objects from infrequently requested objects by the individual object distribution servers of the PoP is based on request counts for those objects that each object distribution server of the PoP receives over a time interval. In some embodiments, the multiple hit load balancing specifies two hits or requests received by a particular object distribution server for a particular object over a specific interval of time as the trigger for the dynamic allocation of the particular object distribution server to cache and serve that particular object. In some other embodiments, the number of hits over a specific interval for the dynamic scaling is greater than two.

FIG. 1 presents an exemplary architecture for multiple hit load balancing in accordance with some embodiments. This architecture is representative of a PoP 110. The PoP 110 has at least one load balancer 120 and a set of object distribution servers 130.

The load balancer 120 is disposed at the PoP 110 point of ingress. The load balancer 120 receives incoming connection requests. This includes connection establishment requests for establishing secure connections. The secure connections can be established according to the SSL, TLS, or other secure protocols. In some embodiments, the load balancer 120 performs a round-robin or other simplistic distribution of the requests across the set of object distribution servers 130. The set of object distribution servers 130 then perform the multiple hit load balancing of some embodiments in a distributed fashion.

The simplistic distribution allows the load balancer 120 to pass the incoming requests across the set of object distribution servers 130 with minimal overhead and almost no processing of the requests. The simplistic distribution performed by the load balancer 120 is not based on the object that is requested through a secure or unsecure connection. In preferred embodiments, the load balancer 120 does not even receive the object request, because the load balancer 120 does not establish or otherwise terminate the connection with the requesting clients. Instead, the load balancer 120 receives a connection establishment request and distributes that connection establishment request to one of the set of object distribution servers 130 using the simplistic distribution. Consequently, the load on the load balancer 120 is greatly reduced. The load balancer 120 is then able to distribute a much larger number of requests than if having to establish, decrypt, or hand-off connections and object requests.

It should be noted that the load balancer 120 can still perform persistent request distribution for unsecure connections given the significantly lower overhead required to hash an unencrypted Uniform Resource Locator (URL) accompanying requests passed over unsecure connections. In such cases, the load balancer 120 receives the connection establishment requests, detects the requests are for unsecure connections, establishes the unsecure connections with the clients, receives unencrypted object requests over the unsecure connections, and performs a persistent distribution of the object requests by hashing or otherwise processing an identifier or URL of the unencrypted object requests.

The set of object distribution servers 130 include two more servers that are collocated and operate from the same PoP 110. The set of object distribution servers 130 respond to the client object requests by serving the requested objects to the clients. The set of object distribution servers 130 are also adapted to perform the multiple hit load balancing of some embodiments. In executing the multiple load balancing, the set of object distribution servers 130 provide a quasi-persistent distribution of object requests amongst one another prior to caching and serving the objects that are the targets of the object requests arriving over the secure connections established by the set of object distribution servers 130. Performing the multiple hit load balancing at the object distribution server level redistributes object requests that may arrive at incorrect non-designated object distribution servers 130 as a result of the simplistic distribution of requests by the load balancer 120.

The set of object distribution servers 130 have memory or storage that they use as a cache to store local copies of the requested objects. In some embodiments, each server of the set of object distribution servers 130 is tasked with caching a different subset of the overall objects that are accessible from the PoP 110. As object popularity increases, the multiple hit load balancing dynamically scales the number of object distribution servers 130 that cache the same object. The multiple hit load balancing therefore continually changes the designation of which subset of objects each object distribution server 130 caches. Stated differently, the multiple hit load balancing causes the set of object distribution servers 130 to cache different sets of objects based on the individual demand that each server receives for those objects.

If a requested object is not in the cache of a first server from the set of object distribution servers 130, the first server can retrieve the object from a remote origin server that is located outside the PoP. Alternatively, the first server can perform a peer retrieval and retrieve the object from a second server of the set of object distribution servers 130 in the PoP 110, wherein the second server is designated to host the object or has otherwise notified the first server that it has a copy of the requested object.

The peer retrieval amongst the set of object distribution servers 130 creates cross traffic in the PoP 110 and consumes bandwidth that the servers 130 otherwise use to serve objects to requesting clients. The more bandwidth that is lost to cross traffic, the less bandwidth the servers 130 have to serve requested objects to clients. Still the amount of time to retrieve objects from within the PoP 110 using peer retrieval is significantly less than retrieving objects from origin servers that are outside the PoP 110. Overall request response and object delivery performance for the PoP 110 is maximized by minimizing the number of object retrievals that occur from remote origin servers and by minimizing the number of total peer retrievals that occur based on the multiple hit load balancing and dynamic scaling of the object distribution servers 130 that cache the same objects.

In some embodiments, each server of the set of object distribution servers 130 in the PoP 110 is logically separated into a front-end node and a back-end node. The logical separation may include executing different virtual machines for the front-end node and the back-end node on the same set of hardware resources, or executing different sets of operations associated with the front-end node and the back-end node on the same set of hardware resources. The front-end node can run in parallel with the back-end node. In some other embodiments, the front-end node runs on different hardware resources than the back-end node with the front-end node and the back-end node running from the same physical or logical network machine.

The logical separation allows the front-end node to execute the multiple hit load balancing while the back-end node dedicates resources to object caching and serving. Each front-end node can therefore provide quasi-persistent request distribution across its own corresponding back-end node and back-end nodes of other object distribution servers or network machines.

Figure 2:
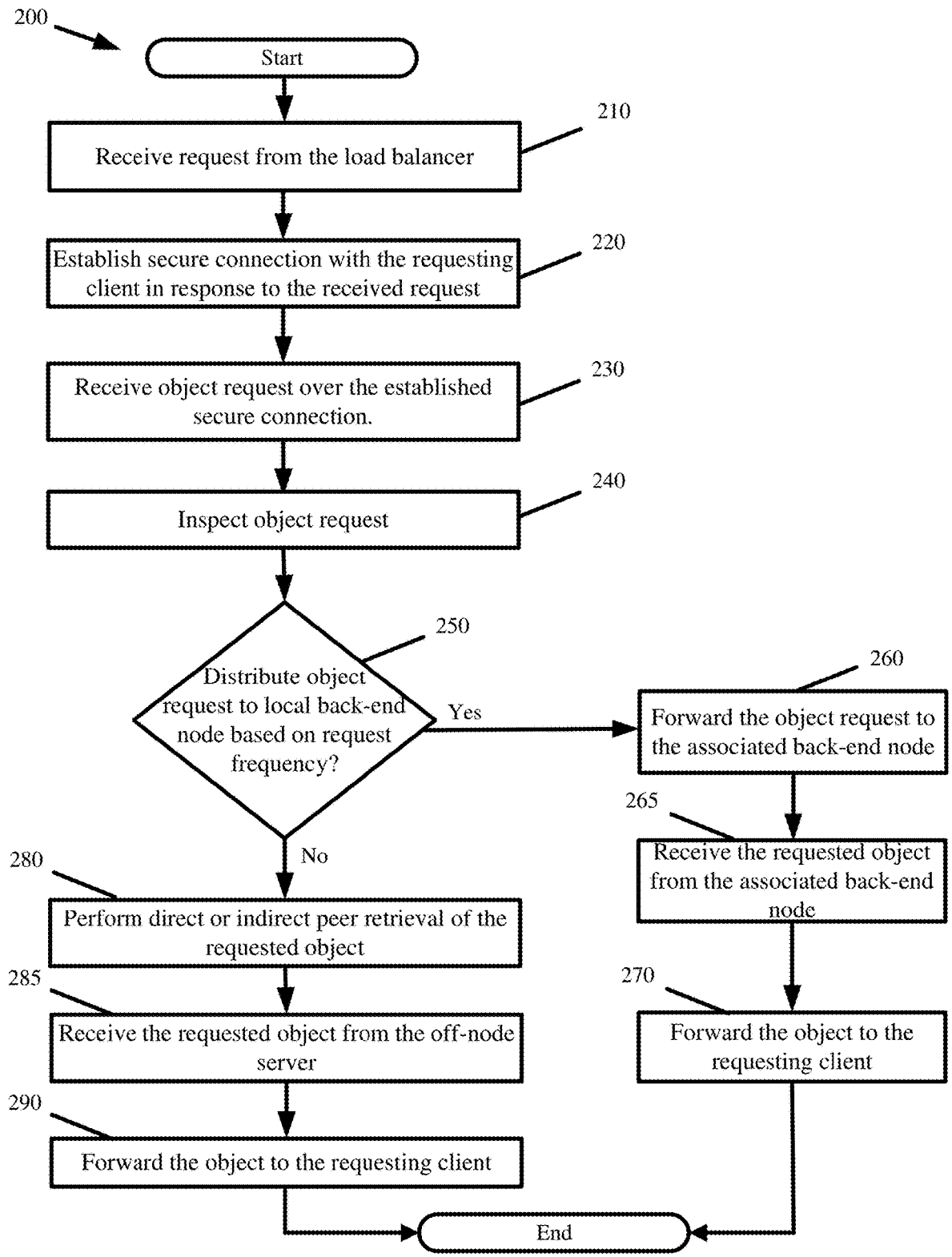
FIG. 2 presents a process performed by a front-end node in accordance with some embodiments.

FIG. 2 presents a process 200 performed by a front-end node in accordance with some embodiments. The process 200 commences with the front-end node receiving (at 210) a request that is distributed by the load balancer. The request can include a connection establishment request for a secure connection.

The process establishes (at 220) a secure connection with the requesting client in response to the received request. The front-end node establishes the secure connection by engaging in the connection handshaking with the client. At the conclusion of the connection handshake, the front-end node becomes a terminating endpoint for that secure connection. The front-end node negotiates security and encryption parameters during the connection handshake.

The process receives (at 230) an object request over the established secure connection. Using the negotiated security and encryption parameters, the front-end node decrypts and inspects (at 240) the object request.

The process distributes the object request according to the quasi-persistent request distribution of the multiple hit load balancing. In particular, the process determines (at 250) whether the object request should be distributed to the back-end node running on the same object distribution server as the front-end node performing process 200 or distributed to a back-end node on a different object distribution server based on the frequency with which the object is requested from the front-end node, wherein selection of the back-end node on the different object distribution server is further based on the hashing of the request URL or a persistent request distribution scheme, such as the Cache Array Routing Protocol (CARP).

The process forwards (at 260) the object request to the back-end node associated with the front-end node in response to the multiple hit load balancing scaling the back-end node to cache and serve the requested object. The process receives (at 265) the requested object from the associated back-end node, wherein the associated back-end node retrieves the requested object from local cache or a remote origin server. The process then forwards (at 270) the requested object to the requesting client that is the other terminating endpoint for the secure connection established with the front-end node at step 220. In some embodiments, forwarding the object involves the front-end node securing or encrypting the object using the negotiated security and encryption parameters for the secure connection before it is passed to the requesting client over the secure connection. Steps 260-270 are performed on the same set of hardware resources or same object distribution server because of the logical separation of the front-end node and the corresponding back-end node. A persistent request distribution is therefore realized as the client requested object is retrieved and served from the same network node or object distribution server that terminates the secure connection with the client.

The process performs (at 280) a direct or indirect peer retrieval of the requested object in response to the multiple hit load balancing not scaling the back-end node on the same server to cache and serve the requested object. An indirect peer retrieval involves the front-end node signaling the associated back-end node on the same server as the front-end node to retrieve the requested object from a back-end node on a different server in the PoP. A direct peer retrieval involves the front-end node identifying the off-node back-end node that is tasked with serving the requested object. In some embodiments, the identification of the off-node back-end node is based on the front-end node hashing the object request URL or object name. The direct peer retrieval then involves the front-end node sending a subrequest for the object to the identified off-node server. Here, the subrequest is sent to a different network node or physical machine in the PoP than the network node or physical machine on which the front-end node performing process 200 executes. The process receives (at 285) the requested object from the off-node server to conclude the peer retrieval. The process then forwards (at 290) the object to the requesting client that is the other terminating endpoint for the secure connection established with the front-end node at step 220.

The quasi-persistent request distribution of the multiple hit load balancing provides the front-end node with control over which objects are stored to the corresponding back-end node cache. In this manner, the multiple hit load balancing enables the front-end server to control the scaling of the associated back-end node for direct caching and serving of objects without further peer retrievals or remote retrievals of the cached objects from origin servers.

Such control over the scaling of the back-end node is based on the associated front-end node tracking request counts for different objects that clients directly request from the front-end node as a result of the load balancer distribution of connections and requests. The front-end node tracks request counts with a bloom filter, a counting bloom filter, other array, or other data structure. The bloom filter is a bit array with each array element or unique set of array elements storing a request count for a different object. Request object URLs hash to the different bloom filter array elements using one or more hashing functions. The stored counts can be reset after a specific interval of time.

Figure 3:
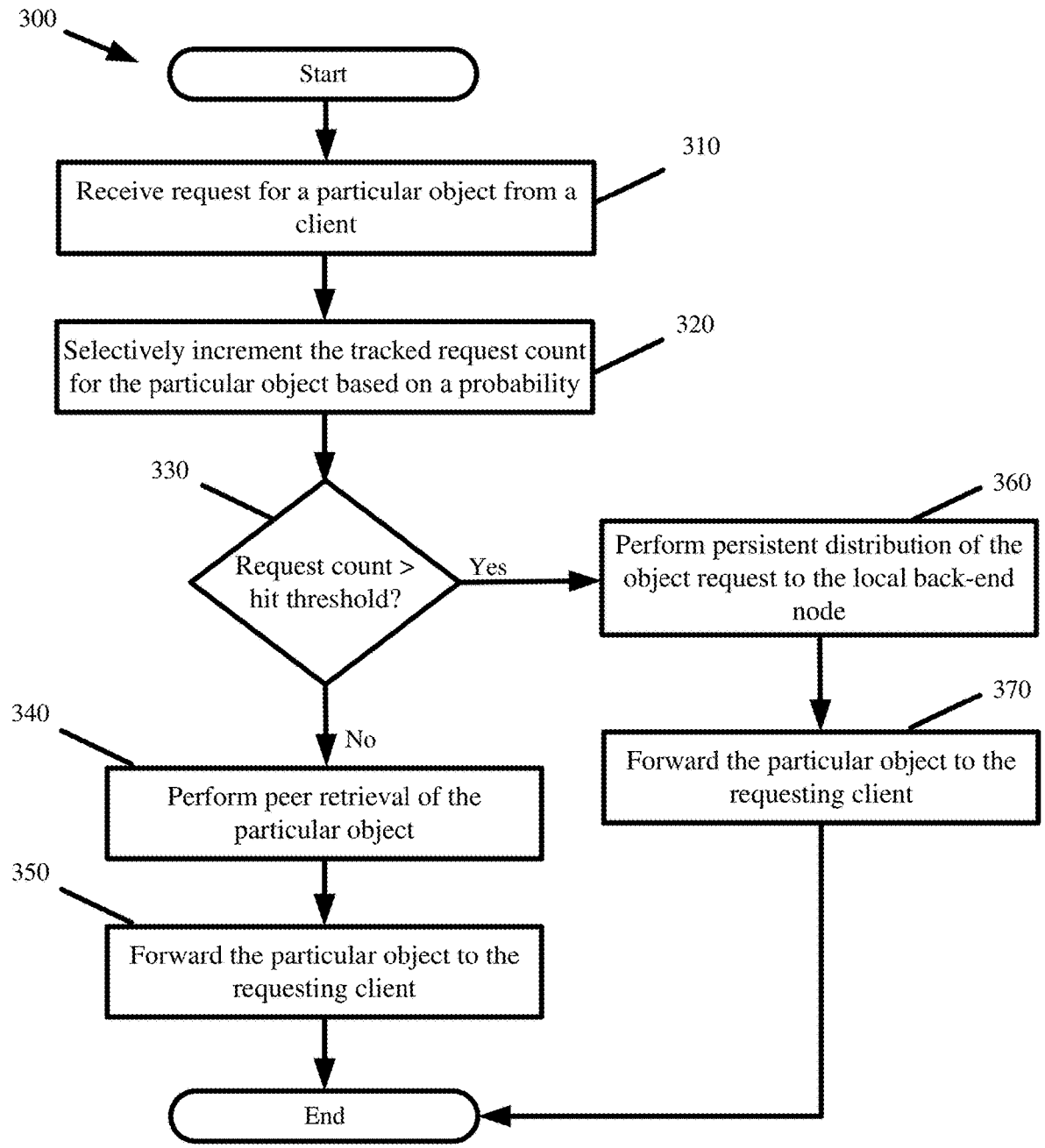
FIG. 3 presents a process for performing the multiple hit load balancing based on the tracked request counts in accordance with some embodiments.

The multiple hit load balancing involves scaling a back-end node to cache and directly serve a particular object when the request count for that particular object in the bloom filter of the corresponding front-end node on the same server exceeds a threshold count. FIG. 3 presents a process 300 for performing the multiple hit load balancing based on the tracked request counts in accordance with some embodiments. Process 300 is performed by the object distribution servers, and more specifically, the front-end nodes of the object distribution servers.

Process 300 commences in response to a front-end node receiving (at 310) a request for a particular object from a client over an established connection with that client. Step 310 may be inclusive of the front-end node receiving a first request that is distributed by a load balancer. The first request may be a connection establishment request. In response to such a first request, the front-end node establishes a secure connection with the requesting client. The front-end node then receives a second request over the secure connection, wherein the second request is an encrypted request for the particular object. The front-end node decrypts the second request using the security and encrypted parameters negotiated with the client as part of establishing the secure network connection.

The process selectively increments (at 320) the tracked request count for the particular object (in the bloom filter or other data structure retained by the front-end node) based on a fixed or changing probability. The probability is one means by which to condition the frequency of a requested object. In some embodiments, the probability is a value of one such that each received request results in an incremented count. In some other embodiments, the probability is less than one such that each received request does not result in incrementing the request count for the particular object. The front-end node increments the request count by hashing the object request URL or object name from the URL. The hash result points to one or more elements in the bloom filter used by the front-end node to track a request count of the particular object. The values of the one or more elements provide the current request count which is then incremented by one.

The process compares (at 330) the request count for the particular object against a hit threshold. The hit threshold is another means to condition the frequency of a requested object, because the hit threshold controls whether a particular object is classified as a frequently or infrequently requested object, and is the basis by which the front-end node scales its associated back-end node for the direct caching and serving of objects.

The multiple hit load balancing classifies the particular object as an infrequently requested object in response to the request count for the particular object not exceeding the hit threshold. In such cases, the process performs (at 340) a peer retrieval of the particular object. In some embodiments, the front-end node hashes the object request URL in order to identify the back-end node on a different object distribution server (i.e., off-node) from which the particular object can be retrieved. In some embodiments, the front-end node uses CARP to identify and select the off-node back-end node from which the particular object can be retrieved. The request or a subrequest for the particular object is then passed from the front-end node to the identified back-end off-node and the back-end off-node returns the particular object to the front-end node which then forwards (at 350) the particular object to the requesting client over the connection established with the client. In some other embodiments, the front-end node sends the request or subrequest to the corresponding back-end node and the corresponding back-end node performs the peer retrieval of the particular object from the back-end off-node. The particular object is then forwarded to the client through the front-end node.

The multiple hit load balancing classifies the particular object as a frequently requested object in response to the request count for the particular object exceeding the hit threshold. In such cases, the process performs (at 360) a persistent distribution. Specifically, the process sends the request or a subrequest for the particular object to the corresponding back-end node on the same object distribution server. In some embodiments, the request or subrequest includes a flag or parameter that signals the corresponding back-end node to cache the particular object if a copy of the particular object does not already reside in cache.

If the hit threshold for the particular object was exceeded with a prior request, the particular object will already be cached by the corresponding back-end node as a result of the multiple hit load balancing or front-end node (implementing the multiple hit load balancing) scaling the back-end node for the direct caching and serving of the particular object. Accordingly, the particular object is passed from the corresponding back-end node cache to the front-end node and the front-end node forwards (at 370) the particular object to the requesting client over the connection established with the client.

If the hit threshold for the particular object is exceeded because of the current request, the corresponding back-end node on the same server as the front-end node will likely not have the particular object in cache. In such cases, the corresponding back-end node retrieves the particular object from an off-node peer or a remote origin server. The particular object is entered into the corresponding back-end node cache and passed to the front-end node. The front-end node then forwards (at 390) the particular object to the requesting client over the connection established with the client.

Figure 4:
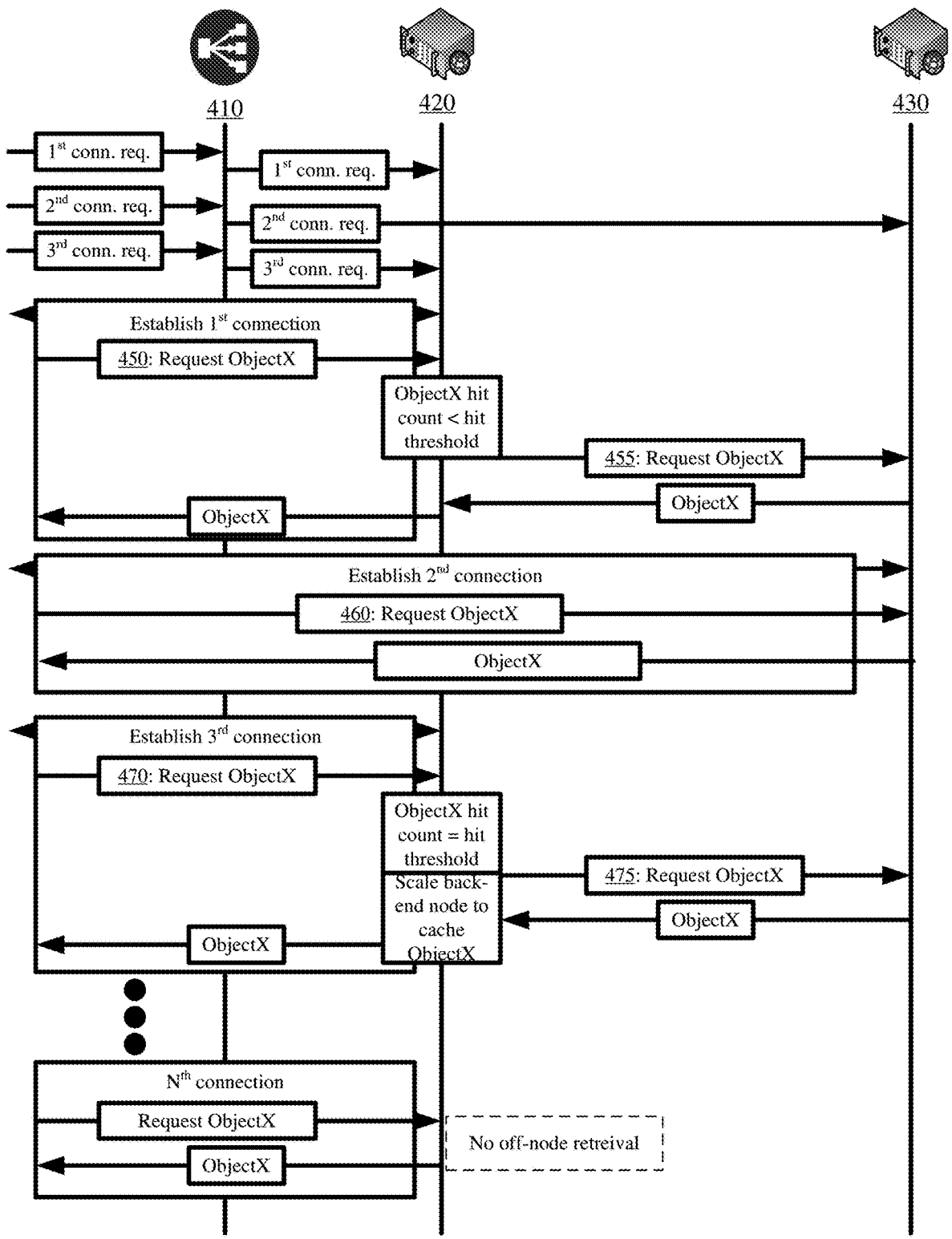
FIG. 4 conceptually illustrates different object distribution servers in a PoP performing multiple hit load balancing in accordance with some embodiments.

FIG. 4 conceptually illustrates different object distribution servers in a PoP performing multiple hit load balancing in accordance with some embodiments. The figure illustrates a load balancer 410 and object distribution servers 420 and 430 of the PoP. The PoP can have additional load balancers or object distribution servers without impacting the multiple hit load balancing implementation.

This figure illustrates the load balancer 410 distributing three different connection establishment requests across the object distribution servers 420 and 430 in a round robin fashion. The object distribution servers 420 and 430 establish connections with the requesting clients and receive various object requests over the established connections.

The first object distribution server 420 receives a first request 450 for a particular object over the first established connection. The first object distribution server 420 increments the hit count it uses to track the number of requests received by the first object distribution server 420 for the particular object. The first object distribution server 420 performs a peer retrieval (at 455) of the particular object from the second object distribution server 430 as a result of the multiple hit load balancing at the first object distribution server 420 not yet scaling the back-end node of first object distribution server 420 for direct caching and serving of the particular object. The back-end node was not scaled because the request count for the particular object at the first object distribution server 420 is less than the hit threshold. In some embodiments, the multiple hit load balancing selects the second object distribution server 430 from which the first object distribution server 420 retrieves the particular object based on a hash result of the first request 450 URL.

The second object distribution server 430 receives a request 460 for the particular object over the second established connection. Since the second object distribution server 430 is designated to directly cache and serve the particular object, it responds to the request 460 by serving a local cached copy of the particular object.

The first object distribution server 420 then receives a second request 470 for the particular object over the third established connection. The second request 470 increments the hit count for the particular object again. The first object distribution server 420 performs another peer retrieval (at 475) of the particular object from the second object distribution server 430. However, the second request 470 causes the hit count for the particular object at the first object distribution server 420 to equal the hit threshold. Accordingly, the second request 470 for the particular object received by the first object distribution server 420 triggers the multiple hit load balancing scaling of the first object distribution server 410. In particular, the multiple hit load balancing scales the first object distribution server 420 back-end node for direct caching and serving of the particular object in addition to the direct caching and serving by the back-end node of the second object distribution node 430. Therefore, the first object distribution server 420 caches the particular object in the back-end node storage after the peer retrieval completes and serves the particular object to the requesting client.

As a result of scaling the first object distribution server 420 back-end node for the particular object, two servers in the PoP are now dynamically allocated for direct caching and serving of the particular object. The dynamic scaling is performed in a decentralized and distributed fashion. In other words, the first object distribution server 420 is scaled based on the request count it receives for the particular object directly from one or more clients irrespective of other requests for the particular object received by other object distribution servers of the same PoP. The peer retrieval cross-traffic for the particular object from the first object distribution server is eliminated because of the dynamic scaling.

Moreover, subsequent object requests for the particular object whether received by the first object distribution server 420 or the second object distribution server 430 can be responded to directly from the local cache of the receiving server without another peer retrieval or remote origin retrieval. The load balancer 410 can therefore continue to distribute requests across the servers 420 and 430 in the simplistic round robin fashion and without any knowledge of the objects to be requested through those connections. The object distribution servers 420 and 430 provide a quasi-persistent request distribution for object requests received as a result of the load balancer 410 non-persistent distribution. In particular, the object distribution servers 420 and 430 dynamically scale to directly cache and serve frequently requested object such that requests for those frequently requested objects can remain on-node as if persistently distributed to the correct server and responded to without any off-node retrievals or intra-PoP cross-traffic.

Figure 5:
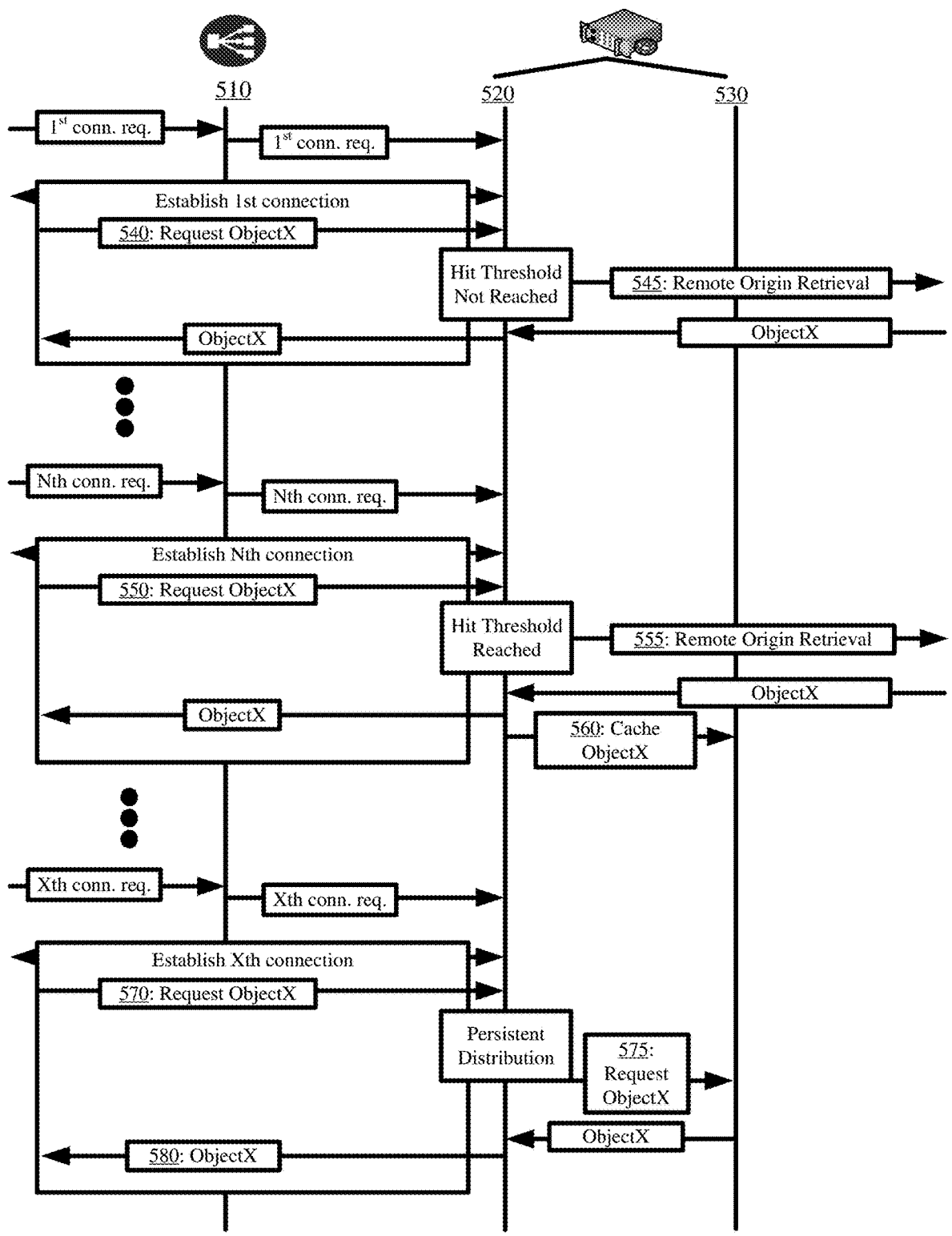
FIG. 5 provides a more detailed view for the dynamic scaling of an object distribution server in accordance with the multiple hit load balancing of some embodiments.

FIG. 5 provides a more detailed view for the dynamic scaling of an object distribution server in accordance with the multiple hit load balancing of some embodiments. This figure illustrates a load balancer 510 and operation of a front-end node 520 and a back-end node 530 of an object distribution server in a PoP comprising multiple object distribution servers (not shown).

The load balancer 510 distributes different connection establishment requests to the front-end node 520 in a non-persistent fashion. Once again, the non-persistent distribution by the load balancer 510 is because the load balancer distribution occurs without knowledge of the objects that are being requested.

The front-end node 520 establishes a first connection with a first client in response to a first connection establishment request distributed by the load balancer 510 to the front-end node 520. The front-end node 520 receives (at 540) a first request for a particular object over the first connection.

The front-end node 520 retrieves (at 545) the particular object from a remote origin server or off-node peer from the same PoP (not shown) because the request count tracked by the front-end node 520 for the particular object does not reach or exceed a hit threshold. The front-end forwards the particular object to the first client over the first connection in response to the first request.

The front-end node 520 establishes a second connection with a second client in response to a second connection establishment request distributed by the load balancer 510 to the front-end node 520. The front-end node 520 receives (at 550) a second request for the particular object over the second connection.

The second request causes the request count for the particular object tracked by the front-end node 520 to reach the hit threshold. Consequently, the multiple hit load balancing on the front-end node 520 triggers the dynamic scaling of the back-end node 530 for direct caching and serving of the particular object. The dynamic scaling occurs in response to the front-end node 520 retrieving (at 555) the particular object from the remote origin server or off-node peer and then passing (at 560) the particular object to the back-end node 530 for caching therein. In some embodiments, the front-end node 520 passes the particular object and provides the back-end node 530 with specific instruction to cache the particular object. The front-end node 520 also forwards the particular object over the second connection in response to the second request.

In some embodiments, the front-end node 520 does not directly retrieve the particular object from the remote origin server, and instead instructs the back-end node 530 to perform the particular object retrieval. Additional instruction may be provided to control whether the back-end node 530 caches the particular object after retrieval. In any case, the back-end node 530 passes the retrieved particular object to the front-end node 520 so that it may be served in response to the client request.

FIG. 5 further shows the front-end node 520 establishing a third connection with a third client in response to a third connection establishment request distributed by the load balancer 510 to the front-end node 520. The front-end node 520 receives (at 570) a third request for the particular object over the third connection.

The front-end node 520 performs a persistent distribution of the third request because a copy of the particular object is cached by the local back-end node 530. Accordingly, the front-end node 520 forwards (at 575) the third request or issues a subrequest for the particular object to the back-end node 530. The back-end node 530 returns the particular object to the front-end node 520. The front-end node 520 then sends (at 580) the particular object to the third client over third connection with the third request being fulfilled without an off-node retrieval or any intra-PoP cross traffic.

The number of hits for triggering the dynamic server scaling can be different for different objects, domain names, or servers. The different hit thresholds provide more granular control over which objects are considered to be frequently or infrequently requested. Similarly, different probabilities for different objects, domain names, or servers can be used in updating the object counts in the server bloom filters. This is another means by which to granularly control object request frequency.

A lower configured hit threshold (e.g., 2) causes the object distribution servers to scale more quickly in response to increased demand for specific objects, whereas a higher configured hit threshold (e.g., 4) causes the object distribution servers to scale more slowly in response to the increased demand. The lower configured hit threshold is preferred for objects that are expected to be frequently requested, whereas the higher configured hit threshold is preferred when a decrease in cache pollution is desired.

The hit increment probability and the hit threshold are two means with which to adjust the multiple hit load balancing, which in turn, adjusts the cache pollution and intra-PoP cross traffic in the PoP. To reduce cache pollution or the number of back-end nodes scaled to cache a common object, some embodiments provide a write threshold. The write threshold limits the amount of data that is written to cache at each individual server or across the set of servers in the PoP over a particular time interval.

Some other embodiments implement selective purging on the back-end nodes. As part of selective purging, the back-end nodes differentiate between caching of designated content and scaled content. The designated content is content that a particular back-end node caches irrespective of request frequency. In other words, the designated content is content that the particular back-end node is expected to cache in order to satisfy peer retrievals from other back-end nodes that perform a hash, CARP, or other means in order to identify which back-end nodes cache which subset of content. The scaled content is additional content that the particular back-end node caches because of increased frequency for that content. Selective purging can prioritize the removal of either designated content or scaled content from cache depending on need.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 6:
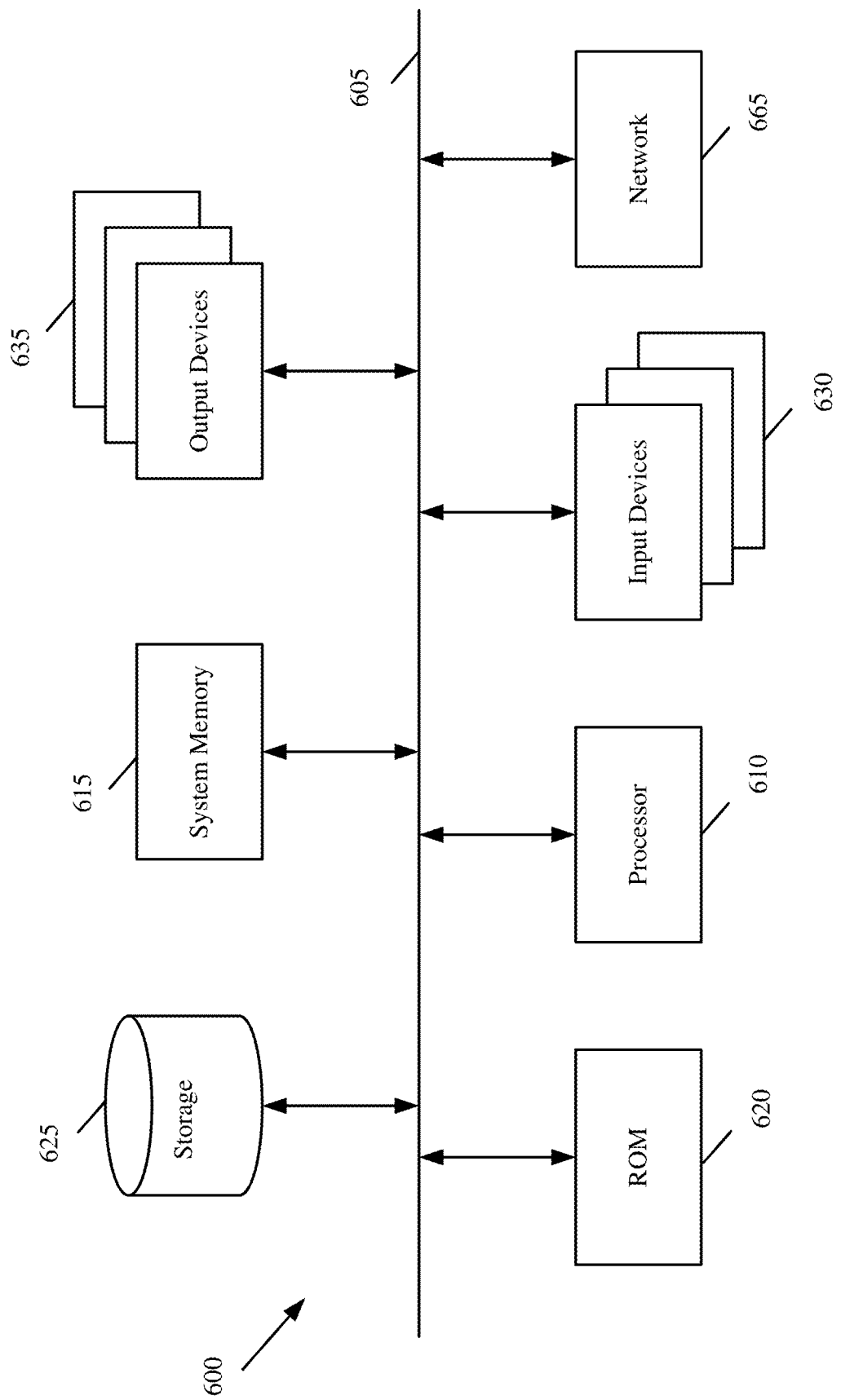
FIG. 6 illustrates a computer system or server with which some embodiments are implemented.

FIG. 6 illustrates a computer system or server with which some embodiments are implemented. Such a computer system includes various types of computer-readable mediums and interfaces for various other types of computer-readable mediums that implement the various methods and machines described above (e.g., load balancer, object distribution server, front-end node, back-end node, etc.). Computer system 600 includes a bus 605, a processor 610, a system memory 615, a read-only memory 620, a permanent storage device 625, input devices 630, and output devices 635.

The bus 605 collectively represents all system, peripheral, and chipset buses that communicatively connect the numerous internal devices of the computer system 600. For instance, the bus 605 communicatively connects the processor 610 with the read-only memory 620, the system memory 615, and the permanent storage device 625. From these various memory units, the processor 610 retrieves instructions to execute and data to process in order to execute the processes of the invention. The processor 610 is a processing device such as a central processing unit, integrated circuit, graphical processing unit, etc.

The read-only-memory (ROM) 620 stores static data and instructions that are needed by the processor 610 and other modules of the computer system. The permanent storage device 625, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 625.

Other embodiments use a removable storage device (such as a flash drive) as the permanent storage device. Like the permanent storage device 625, the system memory 615 is a read-and-write memory device. However, unlike storage device 625, the system memory is a volatile read-and-write memory, such as random access memory (RAM). The system memory stores some of the instructions and data that the processor needs at runtime. In some embodiments, the processes are stored in the system memory 615, the permanent storage device 625, and/or the read-only memory 620.

The bus 605 also connects to the input and output devices 630 and 635. The input devices enable the user to communicate information and select commands to the computer system. The input devices 630 include alphanumeric keypads (including physical keyboards and touchscreen keyboards), pointing devices. The input devices 630 also include audio input devices (e.g., microphones, MIDI musical instruments, etc.). The output devices 635 display images generated by the computer system. The output devices include printers and display devices, such as cathode ray tubes (CRT) or liquid crystal displays (LCD).

Finally, as shown in FIG. 6, bus 605 also couples computer 600 to a network 665 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 600 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   distributing a set of connection establishment requests from a network machine at a point of ingress of a point-of-presence (PoP) to a plurality of object distribution servers operating from the PoP;
   establishing a connection between a particular client and a first object distribution server of the plurality of object distribution servers in response to the network machine distributing a connection establishment request from the set of connection establishment requests to the first object distribution server, wherein said establishing comprises terminating said connection at the particular client and the first object distribution server;
   receiving a request for an object from the particular client over the connection at the first object distribution server;
   obtaining a request count for said object at the first object distribution server;
   determining, by the first object distribution server, a second object distribution server of the plurality of object distribution servers designated as a source host of said object within the PoP based on a hash of the request;
   retrieving said object from the second object distribution server to the first object distribution in response to said determining and the request count being less than or equal to a hit threshold, wherein the hit threshold is a value greater than one;
   caching said object in storage of the first object distribution server in response to the request being equal to the hit threshold;
   responding to a subsequent set of requests for said object directly from the first object distribution server over a first set of connections established between the first object distribution server and a first set of clients, and directly from the second object distribution server over a second set of connections established between the second object distribution server and a second set of clients based on said distributing by the network machine.

2. The method of claim 1, wherein said obtaining comprises tracking at each particular object distribution server of the plurality of object distribution servers, a number of requests the particular object distribution server receives for said object directly from different clients over a particular interval of time.

3. The method of claim 1, wherein the network machine is a load balancer and said distributing comprises performing a non-persistent distribution of connection establishment requests directed to a common object across the plurality of object distribution servers.

4. The method of claim 1 further comprising decrypting in response to said receiving, said request using encryption parameters negotiated between the first object distribution server and the particular client during said establishing, wherein said connection is a secure connection.

5. The method of claim 1 further comprising hashing an identifier comprising part or all of a Uniform Resource Locator (URL) from said request in response to said receiving.

6. The method of claim 5, wherein said obtaining comprises retrieving the request count from a data structure based on a result of said hashing, wherein said data structure stores request counts for different objects requested from the first object distribution server.

7. The method of claim 1 further comprising receiving at the first object distribution server, a second request for said object over a different connection established with a different client.

8. The method of claim 7 further comprising serving said object from said storage of the first object distribution server in response to said second request.

9. A method comprising:
   providing a non-persistent distribution of a plurality of requests, that arrive at a particular site, from a load balancer to a plurality of front-end nodes of a plurality of network servers operating in the particular site;
   establishing a connection between a client and a front-end node of a first network server of the plurality of network servers;
   receiving a request for an object from the client over the connection at the front-end node as a result of providing the non-persistent distribution and establishing the connection;
   tracking a hit count for said object at the front-end node;
   performing a persistent distribution of the request from the front-end node, wherein performing the persistent distribution comprises:
     retrieving said object from a corresponding back-end node on the same first network server in response to the hit count exceeding a hit threshold and the back-end node on the first network server caching the object based on the hit count exceeding the hit threshold, wherein the hit threshold is a numeric value greater than one;
     retrieving said object from a back-end node on a different second network server of the plurality of network servers in response to the hit count being less than said hit threshold and the back-end node of the second network server being tasked with caching the object; and
   serving said object from the front-end node to the client over the connection with said client.

10. The method of claim 9 further comprising selecting the back-end node on the second network server from a plurality of back-end nodes on the plurality of network servers based on a hash of said request, wherein the hash identifies the back-end node of the second network server as being tasked with caching the object.

11. The method of claim 9 further comprising caching said object at the corresponding back-end node on the same first network server in response to said retrieving the object from the back-end node on the second network server and the hit count equaling the hit threshold.

12. The method of claim 9, wherein said tracking comprises tracking request counts for a plurality of objects requested from the front-end node independent of objects requested from other network nodes or front-end node on the other network nodes.

13. The method of claim 9, wherein the plurality of requests that are non-persistently distributed by the load balancer comprise connection establishment requests, and wherein the request received by the first network server comprises an object request.

14. The method of claim 9 further comprising incrementing the hit count according to a specified probability in response to said receiving the request, wherein incrementing the hit count according to the specified probability results in a lower hit count than a hit count incremented in response to each received request for said object.

15. A network point-of-presence (PoP) comprising:
   a load balancer disposed at the network PoP point of ingress, the load balancer distributing a plurality of connection establishment requests from a plurality of clients across a plurality of object distribution servers in the network PoP;
   each particular object distribution server of the plurality of object distribution servers comprising:
      a back-end node comprising storage, said storage caching a plurality of objects requested from the particular object distribution server at least N times over an interval of time, wherein N is a numeric value greater than one; and
      a front-end node comprising:
         a data structure storing request counts for different objects requested from the particular object distribution server as a result of the load balancer distributing a plurality of connection establishment requests; and
         a processor and network interface (i) terminating a connection with a client in response to receiving, from the load balancer as a result of said distributing, a connection establishment request issued by the client and (ii) serving a particular object to the client over said connection in response to an object request from the client over the connection for the particular object, wherein said serving comprises:
            retrieving the particular object from the back-end node of the particular object distribution server in response to a request count of the particular object in the data structure exceeding N, and
            retrieving the particular object from the back-end node of a different object distribution server in response to a request count of the particular object in the data structure being less than N.

16. The network PoP of claim 15, wherein said serving further comprises selecting the different object distribution server from the plurality of object distribution servers based on a hash of a URL from the object request using said processor.

17. The network PoP of claim 15, wherein each particular object distribution server further comprises a common set of hardware resources on which the front-end node of the particular object distribution server and the back-end node of the particular object distribution server operate.

* * * * *